US012108138B2

(12) United States Patent
Hou et al.

(10) Patent No.: US 12,108,138 B2
(45) Date of Patent: Oct. 1, 2024

(54) PHOTOGRAPHING DEVICE AND SELF-ADAPTIVE METHOD OF SOFTWARE FUNCTIONS AND PHOTOGRAPHING PARAMETERS THEREOF

(71) Applicant: Shenzhen Apeman Innovations Technology Co., Ltd., Shenzhen (CN)

(72) Inventors: Jun Hou, Shenzhen (CN); Yanli Huang, Shenzhen (CN); Binbin Wang, Shenzhen (CN)

(73) Assignee: Shenzhen Apeman Innovations Technology Co., Ltd., Shenzhen (CN)

( * ) Notice: Subject to any disclaimer, the term of this patent is extended or adjusted under 35 U.S.C. 154(b) by 99 days.

(21) Appl. No.: 17/993,220

(22) Filed: Nov. 23, 2022

(65) Prior Publication Data

US 2023/0319389 A1     Oct. 5, 2023

(30) Foreign Application Priority Data

Mar. 29, 2022   (CN) .......................... 202210315297.5

(51) Int. Cl.
  *H04N 23/60*   (2023.01)
  *G06K 7/10*    (2006.01)
  *G06V 10/00*   (2022.01)

(52) U.S. Cl.
  CPC ......... *H04N 23/60* (2023.01); *G06K 7/10297* (2013.01); *G06V 10/00* (2022.01)

(58) Field of Classification Search
  CPC ..... H04N 23/60; G06V 10/00; G06K 7/10297

(Continued)

(56) References Cited

U.S. PATENT DOCUMENTS

2004/0169731 A1    9/2004   Shiiyama
2006/0290790 A1*  12/2006   Takaiwa ............. H04N 1/00925
                                                       348/231.99

(Continued)

FOREIGN PATENT DOCUMENTS

CN    102103616 A    6/2011
CN    103841323 A    6/2014

(Continued)

OTHER PUBLICATIONS

CNIPA, Second Office Action for Chinese Patent Application No. 202210315297.5, Jun. 17, 2022, 15 pages.

(Continued)

*Primary Examiner* — Joel W Fosselman
(74) *Attorney, Agent, or Firm* — IP Spring

(57) ABSTRACT

This application provides a photographing device and self-adaptive method of software functions and photographing parameters thereof. The photographing device comprises a photographing module configured to be mounted on a mounting carrier to photograph images, the mounting carrier is provided with a near field identification tag; a memory, configured to store a relationship table recording correspondence between a plurality of preset tag identification codes and a plurality of photographing modes, each photographing mode has corresponding software functions and photographing parameters; a tag identification module, configured to identify a tag identification code of the near field identification tag when the photographing device approaches the near field identification tag; and a processor, configured to determine a photographing mode corresponding to the tag identification code from the relationship table according to the identified tag identification code, and adaptively adjust the software functions and photographing parameters of the (Continued)

photographing module according to the photographing mode.

16 Claims, 4 Drawing Sheets

(58) Field of Classification Search
USPC .................................................. 348/207.11
See application file for complete search history.

(56) References Cited

U.S. PATENT DOCUMENTS

| | | | |
|---|---|---|---|
| 2015/0365573 A1* | 12/2015 | Kim | H04N 23/663 348/376 |
| 2016/0198093 A1 | 7/2016 | Ito et al. | |
| 2016/0330381 A1 | 11/2016 | Kusaka et al. | |

FOREIGN PATENT DOCUMENTS

| | | |
|---|---|---|
| CN | 104660908 A | 5/2015 |
| CN | 104793742 A | 7/2015 |
| CN | 105100619 A | 11/2015 |
| CN | 106203196 A | 12/2016 |
| CN | 107155060 A | 9/2017 |
| CN | 107948526 A | 4/2018 |
| CN | 108289169 A | 7/2018 |
| CN | 208956202 U | 6/2019 |
| CN | 112217986 A | 1/2021 |
| CN | 114422711 A | 4/2022 |
| WO | 2016195144 A1 | 12/2016 |

OTHER PUBLICATIONS

CNIPA, International Search Report for International Patent Application No. PCT/CN2022/121140, Dec. 30, 2022, 7 pages.
CNIPA, Written Opinion for International Patent Application No. PCT/CN2022/121140, Dec. 30, 2022, 8 pages.
EPO, Extended European Search Report for corresponding European Patent Application No. 22208550.8, Jul. 28, 2023, 7 pages.

* cited by examiner

PHOTOGRAPHING DEVICE AND SELF-ADAPTIVE METHOD OF SOFTWARE FUNCTIONS AND PHOTOGRAPHING PARAMETERS THEREOF

CROSS-REFERENCE TO RELATED APPLICATION(S)

The present application claims priority under 35 U.S.C. § 119(a) to and the benefit of Chinese Patent Application No. 202210315297.5, filed on Mar. 29, 2022, the entire disclosure of which is hereby incorporated by reference in its entirety.

TECHNICAL FIELD

The present disclosure relates to photographing field, and in particular to a photographing device and self-adaptive method of software functions and photographing parameters thereof.

BACKGROUND

For outdoor enthusiasts, the camera is one of the must-have travel tools, the camera can effectively record beautiful moments in a travel process. Then, in different travel scenarios, the optimal software functions and photographing parameters of the camera are different. When the user enters an application scenario, or switches from one application scenario to another application scenario, software functions and photographing parameters need to be manually adjusted to suit the current application scenario, and the parameter adjustment process is very complicated, bringing many changes to the user.

SUMMARY

The present disclosure aims to provide a photographing device and self-adaptive method of software functions and photographing parameters thereof to solve above technical problem.

In order to solve above technical problem, a first aspect of the present disclosure provides a photographing device, comprising a photographing module, a memory, a tag identification module, and a processor. The photographing module is configured to be mounted on a mounting carrier to photograph images. The mounting carrier is provided with a near field identification tag. The memory is configured to store a relationship table recording correspondence between a plurality of preset tag identification codes and a plurality of photographing modes, each photographing mode has corresponding software functions and photographing parameters. The tag identification module is configured to identify a tag identification code of the near field identification tag when the photographing device approaches the near field identification tag. The processor is configured to determine a photographing mode corresponding to the tag identification code from the relationship table according to the tag identification code identified by the tag identification module, and further adaptively adjust the software functions and photographing parameters of the photographing module according to the determined photographing mode.

A second aspect of the present disclosure provides a self-adaptive method of software functions and photographing parameters, which is applied to a photographing device, and the photographing device is capable of being mounted on a mounting carrier to photograph images. The method comprises: identifying a tag identification code of a near field identification tag when the photographing device approaches the near field identification tag mounted on the mounting carrier; determining a photographing mode corresponding to the tag identification code from a relationship table pre-stored in the photographing device according to the identified tag identification code, the relationship table recording correspondence between a plurality of preset tag identification codes and a plurality of photographing modes, and each photographing mode has corresponding software functions and photographing parameters; and further adaptively adjusting the software functions and photographing parameters of the photographing module according to the determined photographing mode.

The photographing device and its self-adaptive method of software functions and photographing parameters of the present disclosure can determine a current application scenario of the photographing device according to the tag identification code of the near field identification tag, and adaptively adjust the software functions and photographing parameters suitable for the application scenario, which is more user-friendly and can bring convenience to users.

BRIEF DESCRIPTION OF THE DRAWINGS

In order to explain the technical solutions of the embodiments of the present disclosure more clearly, the following briefly introduces the accompanying drawings that need to be used in the implementation manner. Obviously, the accompanying drawings described below are some embodiments of the present disclosure, for those of ordinary skill in the art, other drawings can also be obtained from these drawings without creative work.

DETAILED DESCRIPTION OF THE EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts fall within the protection scope of the present disclosure.

Unless otherwise defined, all technical and scientific terms used herein have the same meaning as commonly understood by one of ordinary skill in the technical field to which the present disclosure belongs. The terms used herein in the specification of the present disclosure are for the purpose of describing particular embodiments only, and are not intended to limit the present disclosure.

The terms "first", "second" and the like in the description and claims of the present disclosure and the above drawings are used to distinguish different objects, rather than to describe a specific order. The terms like "a," "an," or "the" used in the present disclosure also do not denote a limitation of quantity, but are merely used to denote at least one. The words "comprise" or "include" and similar words mean that the elements or things appearing before the word encompass the elements or things recited after the word and their equivalents, but do not exclude other elements or things. The word "connected" or similar words are not limited to physical or mechanical connections, but may include electrical connections, whether direct or indirect.

In the description of this specification, the terms "embodiment", "specific embodiment", "example", and the like means that a particular feature, structure, material or characteristic described in connection with the embodiment or example is included in at least one of embodiment or example of the present disclosure. In this specification, schematic representations of the above terms do not necessarily refer to the same embodiment or example. Furthermore, the particular features, structures, materials or characteristics described may be combined in any suitable manner in any one or more embodiments or examples.

Figure 1:
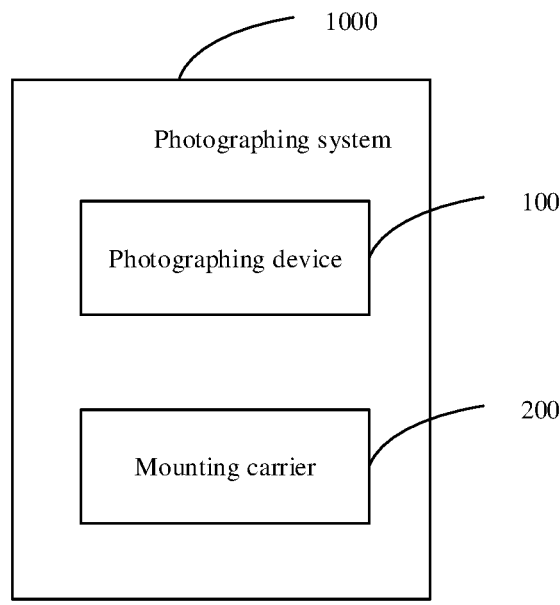
FIG. 1 is a schematic block diagram of a photographing system, according to one embodiment of the present disclosure.

Referring to FIG. 1, FIG. 1 is a schematic block diagram of a photographing system 1000, according to one embodiment of the present disclosure. The photographing system 1000 includes a photographing device 100 and a mounting carrier 200. The photographing device 100 can be, but is not limited to, a motion camera, a common camera, or other various photographing devices having a photographing function, such as a mobile phone, a tablet computer, and the like. The mounting carrier 200 can be a support or a carrier applied to various application scenarios, for example, the mounting carrier 200 can be a crash shell applied to outdoor skiing; or, the mounting carrier 200 can be a water proof shell applied to diving sports; or, the mounting carrier 200 can be a crash shell applied to hiking; or, the mounting carrier 200 can be a crash shell applied to high speed racing. The mounting carrier 200 is provided with a near field identification tag, for example, a Near Field Communication (hereinafter "NFC") tag. The near field identification tag is set within a preset range of a mounting position of the mounting carrier 200 for mounting the photographing device 100, such that, when the photographing device 100 is mounted on the mounting position of the mounting carrier 200, the photographing device 100 can establish a short-range communication connection with the near field identification tag, and perform point-to-point communication, so as to identify the tag identification code of the near field identification tag. In this embodiment, the near field identification tag is an NFC tag. It can be understood that, in at least one embodiment, the near field identification tag can also be other types of tags that can be identified at close range.

Figure 2:
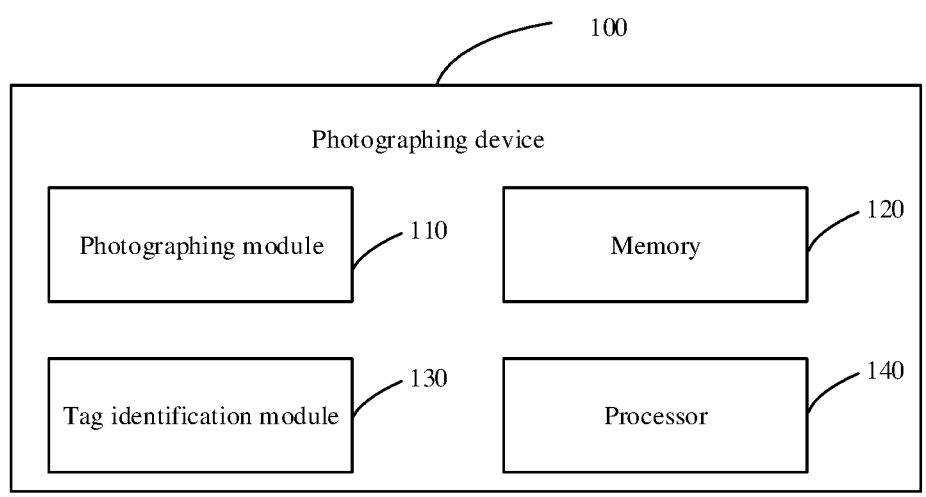
FIG. 2 is a schematic block diagram of a photographing device, according to a first embodiment of the present disclosure.

Referring to FIG. 2, FIG. 2 is a schematic block diagram of a photographing device, according to a first embodiment of the present disclosure. The photographing device 100 includes a photographing module 110, a memory 120, a tag identification module 130, and a processor 140. The processor 140 is electrically coupled to the photographing module 110, the memory 120, and the tag identification module 130 respectively. The photographing module 110 is configured to be mounted on a mounting carrier 200 to photograph images. The memory 120 is configured to store a relationship table recording correspondence between a plurality of preset tag identification codes and a plurality of photographing modes, each photographing mode has corresponding software functions and photographing parameters. The tag identification module 130 is configured to identify a tag identification code of a near field identification tag when the photographing device approaches the near field identification tag. The processor 140 is configured to determine a photographing mode corresponding to the tag identification code from the relationship table according to the tag identification code of the near field identification tag identified by the tag identification module 130; and further adaptively adjust the software functions and photographing parameters of the photographing module according to the determined photographing mode.

Since the photographing device 100 can be applied to various application scenarios, for example, various outdoor scenarios such as underwater, on land, or etc., various application scenarios need to use different software functions and photographing parameters due to differences in illuminance, moving speed, etc. Therefore, in this present disclosure, the photographing device 100 is provided with the tag identification module 130, the tag identification module 130 can identify the tag identification code of the near field identification tag on the mounting carrier 200. The current application scenario of the photographing device can be determined according to the tag identification code of the near field identification tag, and the software functions and the photographing parameters suitable for the application scenario can be adaptively adjusted, which is more user-friendly and can bring convenience to users.

Furthermore, in at least one embodiment, the photographing module 110 is a photographing component with an image photographing function, which can be a camera itself or a photographing module. The memory 120 may be various types of memory having a memory function. The tag identification module 130 is a short-range recognition module, for example, an NFC tag identification module. The processor 140 may be various types of processing chips with data processing and control functions. In this embodiment, the near field identification tag is an NFC tag, the NFC tag is an active tag or a passive tag, and the NFC tag has identifiable data written therein, and the data is in a read-only mode.

Furthermore, in at least one embodiment, the software functions can include but are not limited to video recording, sharing, live broadcasting, downloading, data transmission, editing, light effect, sound, indicator light, graphics, and the like. The photographing parameters can include but are not limited to the photographing resolution, frame rate, white balance, exposure value, and the like. It can be understood that the software functions and the photographing parameters may include other types of software functions and photographing parameters.

Furthermore, in at least one embodiment, the photographing mode may include but are not limited to hiking mode, outdoor cycling mode, diving mode, skiing mode, high-speed racing mode, and the like. It can be understood that the photographing mode may also include other types of photographing modes.

Taking outdoor cycling as an example, the near field identification tag is written with a tag identification code corresponding to the outdoor cycling mode. When the tag identification module 130 of the photographing device 100 identifies the tag identification code corresponding to the outdoor cycling mode, the corresponding model is determined to be the outdoor cycling model, and the photographing module 110 is controlled to be switched to the corresponding software functions and parameters corresponding to the outdoor cycling mode, such as resolution, frame rate, white balance, exposure, etc., so as to achieve excellent user experience.

Figure 3:
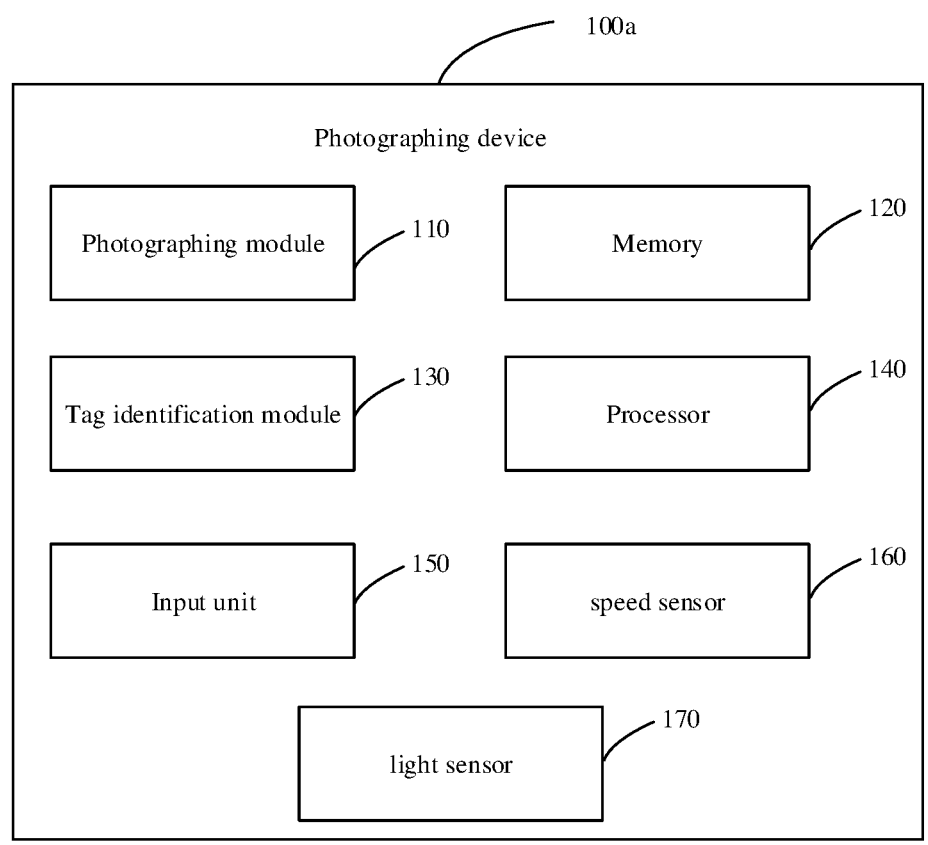
FIG. 3 is a schematic block diagram of a photographing device, according to a second embodiment of the present disclosure.

Referring to FIG. 3, FIG. 3 is a schematic block diagram of a photographing device 100*a*, according to a second embodiment of the present disclosure. The photographing device 100*a* is similar to the photographing device 100, the difference is that the photographing device 100*a* further include an input unit 150. The input unit 150 can be various types of input components, for example, a key component with key input function, or a touch component with touch input function, or a recording component with voice input function, and the like. The input unit 150 is electrically coupled to the processor 140. The input unit 150 can be used to generate a corresponding parameter adjustment signal in response to a user's parameter adjustment operation, for example, the user can manually adjust different software functions and photographing parameters. The processor 140 can be used to adjust the software functions and photographing parameters of the photographing module 110 in response to the parameter adjustment signal, and further control the adjusted software functions and photographing parameters to be stored in the relationship table of the memory 120 after matching with the tag identification code of the near field identification tag on the mounting carrier 200. For example, the processor 140 captures images of different areas according to an image sensor of the photographing module 110, obtains different exposure times of the image sensor, and adjusts appropriate white balance, resolution, ISO value, and the like according to different exposure times.

Therefore, the software functions and photographing parameters corresponding in each application scenario can be more refined adjusted to better adapt to the current application scenario.

Optionally, in at least one embodiment, when the distance between the photographing device 100*a* and the mounting carrier 200 is greater than an identification distance of the tag identification module 130, the processor 140 controls the photographing module 110 to exit the determined photographing mode.

Therefore, when the photographing device 100*a* cannot identify the near field identification tag on the mounting carrier 200 due to the long distance between the photographing device 100*a* and the mounting carrier 200, it indicates that the photographing device 100*a* has been removed from the mounting carrier 200, and there is no need to continue photographing in the current environment. Therefore, it is necessary to exit the current photographing mode.

Optionally, in at least one embodiment, the processor 140 controls the photographing module 110 to enter a default photographing mode after it exits the photographing mode. The default photographing mode can be one of the above photographing modes, or the default photographing mode is another conventional photographing mode.

Optionally, in at least one embodiment, when the tag identification module 130 identifies the tag identification code of the near field identification tag, the processor 140 controls the software functions and photographing parameters of the photographing module 110 to be adjusted to the latest software functions and photographing parameters of the photographing mode matched to the tag identification code.

Therefore, photographing can be carried out according to the latest software functions and photographing parameters of the photographing mode matching the tag identification code, and the photographing effect can be more in line with the photographing needs of users.

Optionally, in at least one embodiment, when the photographing device 100*a* has a plurality of different users, a correspondence table corresponding to each user is also stored in the memory 120, and the input unit 150 also has a user information input function, for example, input user information through face recognition, input user information through speech recognition, input user information through text recognition, and the like. The processor 140 determines the current user according to an input of user information, and matches the corresponding relationship table for the user. The processor 140 further, according to the relationship table matched by the user, adjusts the software functions and photographing parameters of the photographing module 110 to the software functions and photographing parameters corresponding to the tag identification code on the mounting carrier 200 in the relationship table matched by the user.

Therefore, when there are a plurality of users, the corresponding relationship table is set according to the preferences of each user, so that each user can have more personalized software functions and photographing parameters in the corresponding application scenario, which is more humanized.

Optionally, in at least one embodiment, the photographing device 100*a* also includes a speed sensor 160. The speed sensor 160 is used to sense a moving speed of the photographing device 100*a* and generate a corresponding speed sensing signal. The processor 140 responds to the speed sensing signal to determine the moving speed of the photographing device 100*a*. It can be understood that the processor 140 also dynamically adjusts, according to the moving speed of the photographing device 100*a*, the software functions and photographing parameters of the photographing module 110 under the current photographing mode, so as to match the moving speed of the photographing device 100*a*, thereby achieving better photographing results.

Therefore, no matter how fast or slow the moving speed of the photographing device 100*a* is, the photographing effect of the photographing device 100 will not be affected.

Optionally, in at least one embodiment, the photographing device 100*a* also includes a light sensor 170. The light sensor 170 is electrically coupled to the processor 140. The light sensor 170 is used to sense current ambient light and generate a corresponding illumination sensing signal. The processor 140 is used to determine a current illumination intensity in response to the illumination sensing signal, and dynamically adjust the software functions and photographing parameters of the photographing module 110 in the current photographing mode according to the above mentioned illumination intensity, so as to match the illumination intensity of the current environment of the photographing device 100*a*, thereby achieving better photographing effect.

Therefore, a good photographing effect will have in this present disclosure whether it is sunny day, a cloudy day or a rainy day.

Figure 4:
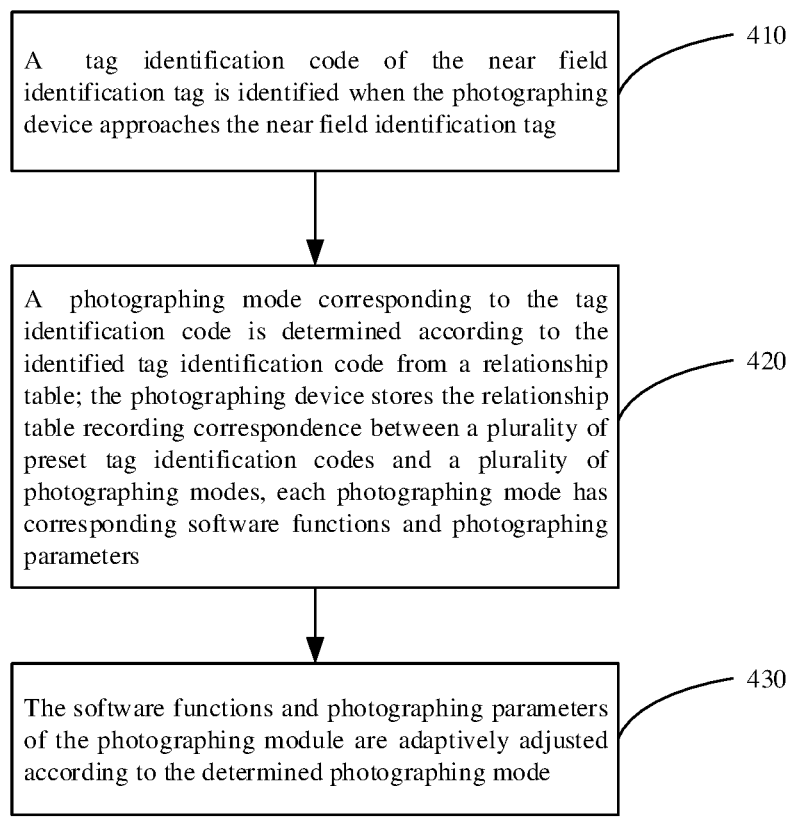
FIG. 4 illustrates a schematic flowchart of a self-adaptive method of software functions and photographing parameters, according to a first embodiment of the present disclosure.

Please referring to FIG. 4, FIG. 4 illustrates a schematic flowchart of a self-adaptive method of software functions and photographing parameters, according to a first embodiment of the present disclosure. The method is applied to a photographing device, the photographing device can be the above photographing device 100 or the above photographing device 100, the photographing device can be mounted on a mounting carrier 200 to photograph images. The mounting carrier 200 is mounted with a near field identification tag. The method includes following steps:

Block 410: a tag identification code of the near field identification tag is identified when the photographing device approaches the near field identification tag.

Block 420: a photographing mode corresponding to the tag identification code is determined according to the identified tag identification code from a relationship table; the photographing device stores the relationship table recording correspondence between a plurality of preset tag identification codes and a plurality of photographing modes, each photographing mode has corresponding software functions and photographing parameters.

Block 430: the software functions and photographing parameters of the photographing module 110 are adaptively adjusted according to the determined photographing mode.

Because the photographing device can be applied to a variety of different application scenarios, for example, outdoor scenarios such as underwater, on land and the like, various application scenarios need to use different software functions and photographing parameters to have good photographing effects due to different illumination, moving speed and the like. Therefore, in this application, the photographing device can identify the tag identification code of the near field identification tag on the mounting carrier 200, and determine the current application scenario of the photographing device according to the tag identification code, and can adaptively adjust the software functions and photographing parameters suitable for the current application scenario, which is more humanized and can bring convenience to the user.

Furthermore, in at least one embodiment, the software functions and photographing parameters may include but are not limited to photographing resolution, frame rate, white balance and exposure value, and the like. It can be understood that the software functions and photographing parameters may also include other types of software functions and photographing parameters.

Furthermore, in at least one embodiment, the photographing modes may include but are not limited to hiking mode, outdoor cycling mode, diving mode, skiing mode, high-speed racing mode, and the like. It can be understood that the photographing mode may also include other types of photographing modes.

Taking outdoor cycling as an example, the near field identification tag is written with a tag identification code corresponding to the outdoor cycling mode. When the tag identification module 130 of the photographing device 100 identifies the tag identification code corresponding to the outdoor cycling mode, the corresponding model is determined to be the outdoor cycling model, and the photographing module 110 is controlled to be switched to the corresponding software functions and parameters corresponding to the outdoor cycling mode, such as resolution, frame rate, white balance, exposure, and the like, so as to achieve excellent user experience.

Figure 5:
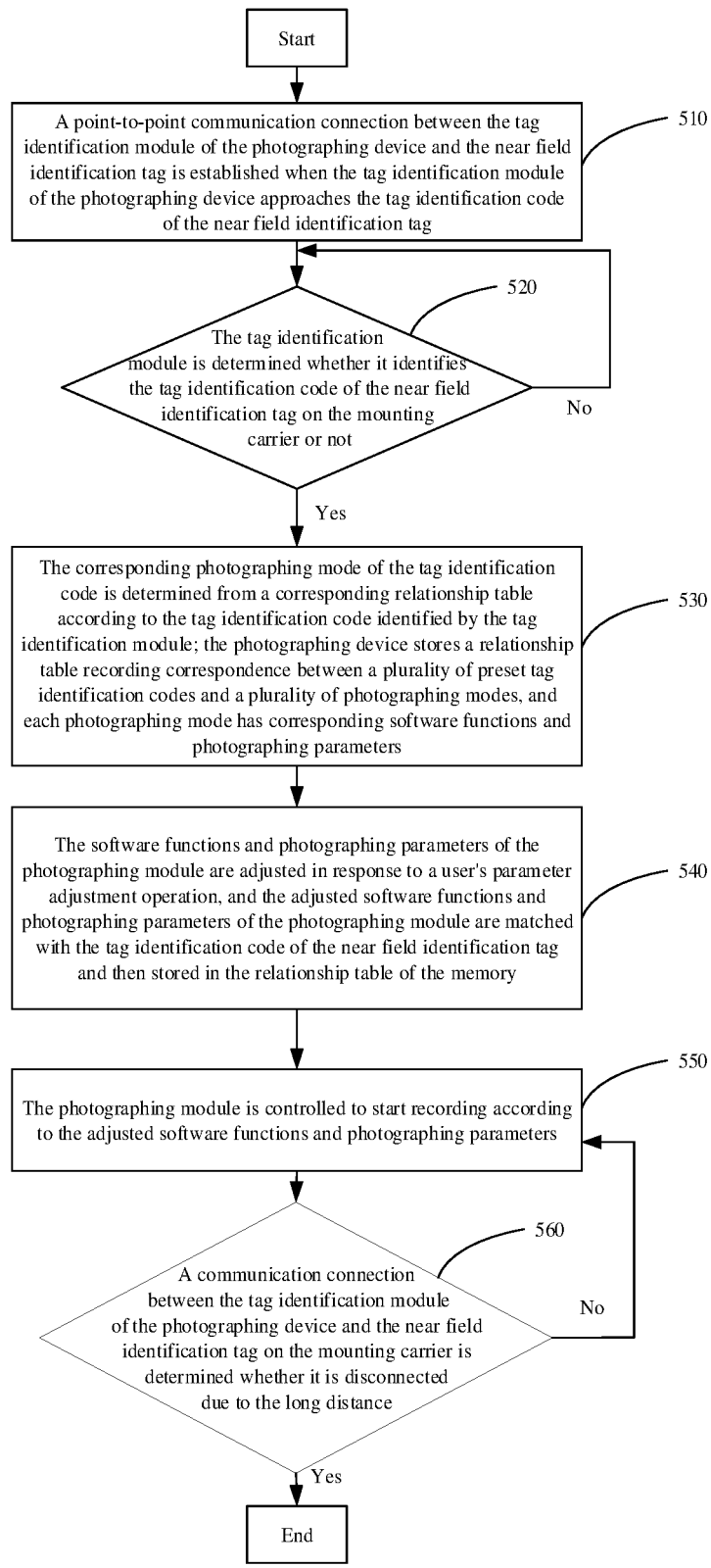
FIG. 5 illustrates a schematic flowchart of a self-adaptive method of software functions and photographing parameters, according to a second embodiment of the present disclosure.

Referring to FIG. 5, FIG. 5 illustrates a schematic flowchart of a self-adaptive method of software functions and photographing parameters, according to a second embodiment of the present disclosure. The self-adaptive method of software functions and photographing parameters includes following steps.

Block 510: a point-to-point communication connection between the tag identification module 130 of the photographing device and the near field identification tag is established when the tag identification module 130 of the photographing device approaches the tag identification code of the near field identification tag.

Block 520: the tag identification module 130 is determined whether it identifies the tag identification code of the near field identification tag on the mounting carrier 200 successfully or not. If the recognition is successful, the process goes to step 530. If the recognition is not successful, the process repeats step 520.

Block 530: the corresponding photographing mode of the tag identification code is determined from a corresponding relationship table according to the tag identification code identified by the tag identification module 130. The photographing device stores a relationship table recording correspondence between a plurality of preset tag identification codes and a plurality of photographing modes, and each photographing mode has corresponding software functions and photographing parameters.

Block 540: the software functions and photographing parameters of the photographing module 110 are adjusted in response to a user's parameter adjustment operation, and the adjusted software functions and photographing parameters of the photographing module 110 are matched with the tag identification code of the near field identification tag and then stored in the relationship table of the memory 120.

Block 550: the photographing module 110 is controlled to start recording according to the adjusted software functions and photographing parameters.

Block 560: a communication connection between the tag identification module 130 of the photographing device and the near field identification tag on the mounting carrier 200 is determined whether it is disconnected due to the long distance. If yes, the connection is terminated. If no, the process repeats step 550.

Thus, the software functions and photographing parameters on each application scenario can be more refined adjusted to better adapt to the current application scenario. Moreover, when the photographing device cannot identify the near field identification tag located on the mounting carrier 200 due to the long distance between the photographing device and the mounting carrier 200, it indicates that the photographing device 100 has been removed from the mounting carrier 200, and there is no need to continue photographing in the current environment. Therefore, it is necessary to exit the current photographing mode.

Optionally, in at least one embodiment, the self-adaptive method of software functions and photographing parameters also includes steps: after controlling the photographing module 110 to exit the photographing mode, the photographing module 110 is also controlled to enter a default photographing mode. The default photographing mode can be one of the above photographing modes, or the default photographing mode is another conventional photographing mode.

Optionally, in at least one embodiment, the self-adaptive method of software functions and photographing parameters also includes steps: when the tag identification module 130 is controlled to identify the tag identification code of the near field identification tag again, the software functions and photographing parameters of the photographing module 110 are adjusted to the latest software functions and photographing parameters of the photographing mode matching the tag identification code.

Therefore, photographing can be carried out according to the latest software functions and photographing parameters of the photographing mode matching the tag identification code, and the photographing effect can be more in line with the photographing needs of users.

Furthermore, in at least one embodiment, when the photographing device has a plurality of different users, the relationship table for each user is stored in the photographing device, and the self-adaptive method of software functions and photographing parameters also includes steps: determining a current user according to an input of user information; matching a relationship table for the user; and adjusting, according to the corresponding table matched by the user, the software functions and photographing parameters of the photographing module 110 to the software functions and photographing parameters corresponding to the tag identification code in the mounting carrier 200 in the relationship table matched by the user.

Therefore, when there are a plurality of users, the relationship table is set according to the preferences of each user, so that each user can have more personalized software functions and photographing parameters in the corresponding application scenario, which is more humanized.

Optionally, in at least one embodiment, the self-adaptive method of software functions and photographing parameters also includes steps: sensing a moving speed of the photographing device; dynamically adjusting the software functions and photographing parameters of the photographing module 110 to match the moving speed of the photographing device according to the moving speed of the photographing device under the current photographing mode.

Thus, no matter how fast or slow the moving speed of the photographing device is, the photographing effect of the photographing device 100 will not be affected.

Optionally, in at least one embodiment, the self-adaptive method of software functions and photographing parameters also includes steps: sensing a current illumination intensity; dynamically adjusting the software functions and photographing parameters of the photographing module 110 in the current photographing mode to match the current illumination intensity of the current environment of the photographing device according to the illumination intensity.

Thus, whether sunny day, cloudy day or rainy day, there will be a good photographing effect.

In the above embodiments, the description of each embodiment has its own emphasis. For the part of one embodiment that is not described in detail, refer to the related description of other embodiments.

It should be understood that in one or more of the embodiments provided in the present disclosure, the embodiments of photographing device 100, 100a disclosed are only schematic and may have other realizations. For example, the division of the unit is only a logical function division. In actual implementation, there can be another division way, for example, multiple units or components can be combined or integrated into another system, or some features can be ignored or not executed.

The above is the embodiments of the present disclosure. It should be noted that for those of ordinary skill in the art, improvements and refinements may be made without leaving the principles of embodiments of the present disclosure, and these improvements and refinements are also considered as the protection scope of the present disclosure.

What is claimed is:

1. A photographing device, wherein the photographing device comprises:
  photographing component being mounted on a mounting carrier to photograph images, wherein the mounting carrier is provided with a near field identification tag;
  a memory storing a relationship table recording correspondence between a plurality of preset tag identification codes and a plurality of photographing modes, each photographing mode has corresponding software functions and photographing parameters;
  tag identifier identifying a tag identification code of the near field identification tag when the photographing device approaches the near field identification tag; and
  a processor determining, according to the tag identification code identified by the tag identifier, a photographing mode corresponding to the tag identification code from the relationship table, and adaptively adjusting the software functions and photographing parameters of the photographing component according to the determined photographing mode, wherein:
  the photographing device also comprises an input unit; the input unit generates a corresponding parameter adjustment signal in response to a user parameter adjustment operation; the processor adjusts software functions and photographing parameters in response to the parameter adjustment signal; and the adjusted software functions and photographing parameters are controlled by the processor to match with the tag identification code of the near field identification tag on the mounting carrier and then stored in the relationship table of the memory.

2. The photographing device according to claim 1, wherein when a distance between the photographing device and the mounting carrier is greater than an identification distance of the tag identifier, the processor controls the photographing component to exit the photographing mode.

3. The photographing device according to claim 2, wherein when the tag identifier is controlled to identify the tag identification code of the near field identification tag again, the processor controls the software functions and photographing parameters of the photographing component to be adjusted to latest software functions and photographing parameters of the photographing mode corresponding to the tag identification code.

4. The photographing device according to claim 1, wherein when photographing device has a plurality of different users, the photographing device also stores relationship tables each corresponding one user, and the processor determines a current user according to input of user information, and matches one relationship table for the user, and adjusts, according to the matching relationship table, the software functions and photographing parameters of the photographing component to the corresponding software functions and photographing parameters corresponding to the tag identification code in the mounting carrier in the relationship table matching the user.

5. The photographing device according to claim 1, wherein the photographing device is a motion camera and is configured in outdoor sports scenarios.

6. The photographing device according to claim 1, wherein the mounting carrier is a waterproof shell configured for underwater movement or an anti-collision shell configured for outdoor non-underwater movement.

7. The photographing device according to claim 1, wherein the photographing device also comprises a speed sensor electrically coupled to the processor, and the speed sensor is configured to sense a moving speed of the photographing device and generate a corresponding speed sensing signal; and the processor also responds to the speed sensing signal to determine the moving speed of the photographing device, and further dynamically adjust, according to the moving speed of the photographing device, the software functions and photographing parameters in the current photographing mode of the photographing component so as to match the moving speed of the photographing device.

8. The photographing device according to claim 1, wherein the photographing device also comprises a light sensor electrically coupled to the processor, the light sensor senses current ambient light and generates a corresponding light sensing signal; and the processor determines an illumination intensity in response to the light sensing signal, and further dynamically adjusts, according to the illumination intensity, the software functions and photographing parameters of the photographing component in the current photographing mode so as to match the illumination intensity of current environment of the photographing device.

9. A self-adaptive method of software functions and photographing parameters, which is applied to a photographing device, wherein the photographing device is capable of being mounted in a mounting carrier to photograph images, the photographing device comprises a photographing component, wherein the method comprises:
  identifying a tag identification code of a near field identification tag mounted on the mounting carrier when the photographing device approaches the near field identification tag;
  determining a photographing mode corresponding to the tag identification code from a relationship table pre-stored in the photographing device according to the identified tag identification code, wherein the relationship table recording correspondence between a plurality of preset tag identification codes and a plurality of photographing modes, each photographing mode has corresponding software functions and photographing parameters; and
  adaptively adjusting the software functions and photographing parameters of the photographing component according to the determined photographing mode;
  wherein the method further comprises:
  generating a corresponding parameter adjustment signal in response to a user's parameter adjustment operation;
  adjusting the software functions and photographing parameters of the photographing component in response to the parameter adjustment signal; and
  storing the adjusted software functions and photographing parameters in the relationship table of the photographing device after matching with the tag identification code of the near field identification tag on the mounting carrier.

10. The self-adaptive method of software functions and photographing parameters according to claim 9, wherein the method comprises:
  determining whether a distance between the photographing device and the mounting carrier is greater than an identification distance of the near field identification tag; and
  controlling the photographing component to exit the photographing mode when the distance between the photographing device and the mounting carrier is greater than the identification distance.

11. The self-adaptive method of software functions and photographing parameters according to claim 10, wherein the method comprises:
  when a near field tag identification function is started again, controlling the software functions and photographing parameters to be adjusted to match latest software functions and photographing parameters corresponding to the determined photographing model.

12. The self-adaptive method of software functions and photographing parameters according to claim 9, wherein when photographing device has a plurality of different users, the photographing device also stores relationship tables each corresponding one user, and the method further comprises:
  determining a current user according to input of user information;
  matching a corresponding relationship table for the user; and
  adjusting, according to the relationship table matched by the user, the software functions and photographing parameters of the photographing component to the software functions and photographing parameters corresponding to the tag identification code, located on the mounting carrier, in the relationship table matched by the user.

13. The self-adaptive method of software functions and photographing parameters according to claim 9, wherein the photographing device is a motion camera and is applied to outdoor sports scenarios.

14. The self-adaptive method of software functions and photographing parameters according to claim 9, wherein the mounting carrier is a waterproof shell configured for underwater movement or an anti-collision shell configured for outdoor non-underwater movement.

15. The self-adaptive method of software functions and photographing parameters according to claim 9, wherein the photographing device also comprises a speed sensor, and the method also comprises:
  the speed sensor sensing a moving speed of the photographing device and generating a corresponding speed sensing signal;
  determining the moving speed of the photographing device in response to the speed sensing signal; and
  dynamically adjusting, according to the moving speed of the photographing device, the software functions and photographing parameters of the photographing component under the current photographing mode so as to match the moving speed of the photographing device.

16. The self-adaptive method of software functions and photographing parameters according to claim 9, wherein the photographing device also comprises a light sensor, and the method also comprises:
  the light sensor sensing current ambient light and generating a corresponding illumination sensing signal;
  determining a current illumination intensity in response to the illumination sensing signal; and
  dynamically adjusting the software functions and photographing parameters of the photographing component in the current photographing mode according to the current illumination intensity so as to match the current illumination intensity of current environment of the photographing device.

* * * * *